July 5, 1949.    L. A. WILLIAMS    2,475,266
GARAGE CREEPER

Filed July 29, 1947

INVENTOR.
Leo A. Williams
BY
McMorrow, Berman + Davidson
ATTORNEYS

Patented July 5, 1949

2,475,266

UNITED STATES PATENT OFFICE 2,475,266

GARAGE CREEPER

Leo A. Williams, Rock Hall, Md.

Application July 29, 1947, Serial No. 764,282

2 Claims. (Cl. 219—19)

This invention relates to improvements in garage creepers, and has for its primary objects to provide a device of this type which is light in construction, and which may therefore be easily moved from place to place, and readily manipulated beneath a car or the like, while supporting a mechanic in prone position.

A further object of the invention resides in the provision, in a device of the type described, of a control heating means for the comfort of the operator when working upon cold, damp and drafty garage floors.

A further object of the invention resides in the provision of a device of this type in which the lamp for illuminating the work is normally positioned above the head of the mechanic, so that the light will at no time be directly in his eyes, and which may, nevertheless, be directed in any desired direction, upon the work.

The foregoing and other objects and features of the invention will be made fully apparent to those skilled in the art from a consideration of the following detailed description taken in conjunction with the accompanying drawings, in which.

Figure 1:
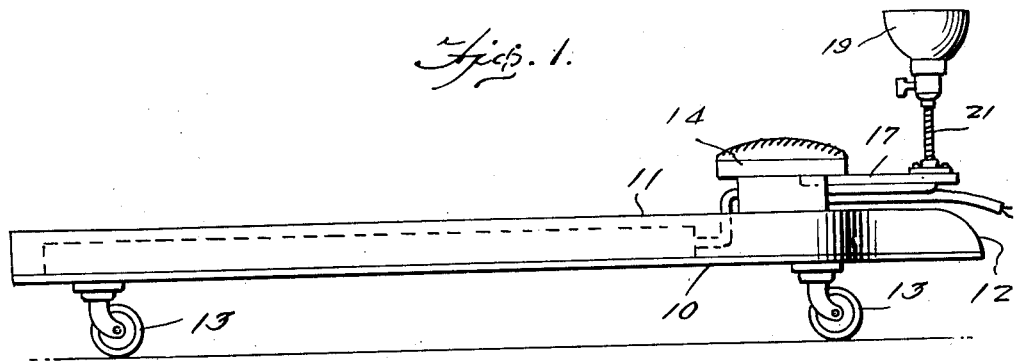
Figure 1 shows the garage creeper of the present invention in side elevation.
Figure 2:
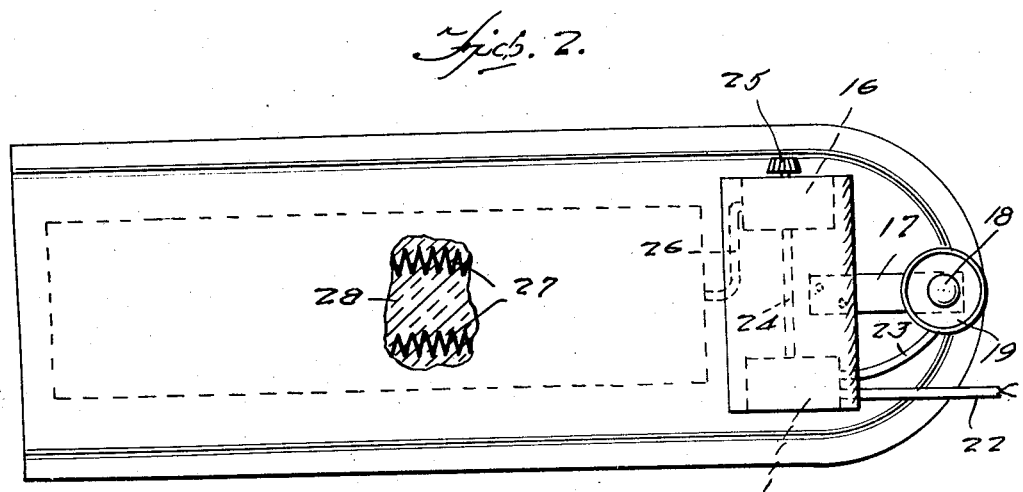
Figure 2 is a top plan view, with parts broken away to show internal construction.
Figure 3:
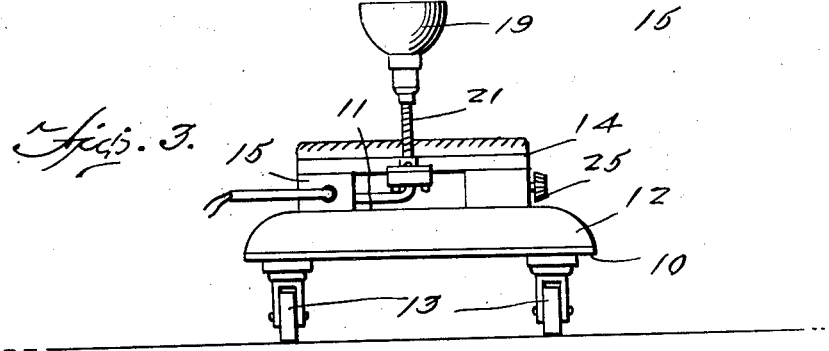
Figure 3 shows the creeper in front elevation.

In the drawings, the body of the creeper shown is formed in two parts comprising a flat base 10 and a top 11. Both parts are of sheet metal of sufficient gauge to provide the required strength to support the body of a mechanic, and may be of light material, for example, aluminum. The top 11 has curved, downwardly-sloping edges 12, the front ends are arc-shaped, as may be seen in Figure 2, and the rear ends are straight. The two parts are rigidly secured together either by bolts or by welding, and together form a rigid, flat, hollow metallic body which is mounted on casters 13 rigidly secured to the base 10.

A padded head rest 14 is supported above the surface of the top 11 by a junction box 15 at one end thereof and a control box 16 at the opposite end. A bracket 17 secured to the under side of the head rest 14 supports the lamp 18 having an upwardly-directed opaque shade 19 mounted upon a flexible conduit 21. An electrical supply line 22 leads into the inlet or junction box 15 from which conductors 23 and 24 lead to the lamp and the control box 16, respectively. A knob 25 controls the flow of current from the control box 16 through a conductor 26 to heating coils 27 provided within the hollow body formed by the parts 10 and 11. The heating coils 27 are embeded in suitable insulating material 28.

It will be apparent from the foregoing that the garage creeper of the present invention provides a construction which is light in weight and easily carried, and which may be readily manipulated by a mechanic into any desired position. Since the entire metal body will be heated in cold weather by the coils 27, no part thereof is uncomfortable to the touch of the mechanic, lying thereon, and he will be comfortably heated, having full control over the temperature by means of the knob 25 which is within easy reach. The utility of such heating arrangement will be appreciated when it is considered that many mechanics contract chronic colds and rheumatism from lying for long hours on or adjacent cold garage floors.

In warm weather the heat of the lamp 18 will not increase the temperature to which the mechanic will be subjected, since this lamp will be above the operator and the heat thereof is carried away from him. Also, regardless of whether the mechanic is lying on his back or upon his side, he will not be subjected to the direct glare of the lamp.

While there has been herein described a preferred embodiment of the invention, other embodiments thereof within the scope of the appended claims will be obvious to those skilled in the art from a consideration of the form shown and the teachings hereof.

Having thus described the invention, I claim:

1. A garage creeper comprising a creeper body comprising upper and lower sheet metal plates secured together at their edges and spaced to provide an interior chamber substantially coextensive with said plates, an insulated heating means extending lengthwise of said chamber for raising the temperature of said creeper body as a whole, said heating means comprising an electrical heating element, current control means for said heating element comprising a box mounted on the top of said creeper body at the head end thereof, a head rest supported on said box, and a control handle on said box at one side of said head rest within reach of the hand of a worker lying on said creeper.

2. A garage creeper comprising a creeper body comprising upper and lower sheet metal plates secured together at their edges and spaced to provide an interior chamber substantially coextensive with said plates, an insulated heating means extending lengthwise of said chamber for raising the temperature of said creeper body as a whole, said heating means comprising an electrical heating element, current control means for said heating element comprising a box mounted on the top of said creeper body at the head end thereof, a head rest supported on said box, and a control handle on said box at one side of said head rest within reach of the hand of a worker lying on said creeper, said headrest being thereby spaced upwardly from the top of said creeper body, a bracket secured to project rearwardly from said headrest, a flexible conduit fixed to rise from said bracket behind said headrest, and an electric reflector lamp mounted on the upper end of said flexible conduit within reach of a hand of the worker lying on said creeper.

LEO A. WILLIAMS.

REFERENCES CITED

The following references are of record in the file of this patent:

UNITED STATES PATENTS

| Number | Name | Date |
| --- | --- | --- |
| 1,058,270 | Stephens | Apr. 8, 1913 |
| 1,398,384 | Loeser | Nov. 29, 1921 |
| 1,704,127 | Hicks | Mar. 5, 1929 |
| 2,087,112 | Nishinaka | July 13, 1937 |
| 2,291,094 | McCarthy | July 28, 1942 |
| 2,313,864 | Crise | Mar. 16, 1943 |

FOREIGN PATENTS

| Number | Country | Date |
| --- | --- | --- |
| 796,203 | France | Jan. 17, 1936 |